United States Patent
Staab (10) Patent No.: US 7,725,769 B1
(45) Date of Patent: May 25, 2010

(54) LATENT VBO RESET CIRCUIT

(75) Inventor: David R. Staab, Los Gatos, CA (US)

(73) Assignee: ZiLOG, Inc., San Jose, CA (US)

( * ) Notice: Subject to any disclaimer, the term of this patent is extended or adjusted under 35 U.S.C. 154(b) by 830 days.

(21) Appl. No.: 11/448,514

(22) Filed: Jun. 7, 2006

(51) Int. Cl.
*G06F 11/00* (2006.01)

(52) U.S. Cl. .............................. 714/22; 714/14; 714/23; 713/340

(58) Field of Classification Search .................... 714/14, 714/22, 23, 24; 713/340
See application file for complete search history.

(56) References Cited

U.S. PATENT DOCUMENTS

| | | | | |
|---|---|---|---|---|
| 5,606,511 | A * | 2/1997 | Yach | 702/64 |
| 5,831,460 | A * | 11/1998 | Zhou | 327/143 |
| 6,178,516 | B1 * | 1/2001 | Meade | 713/300 |
| 6,195,754 | B1 * | 2/2001 | Jardine et al. | 713/324 |
| 6,425,087 | B1 * | 7/2002 | Osborn et al. | 713/340 |
| 6,571,343 | B1 * | 5/2003 | Johnson et al. | 713/340 |
| 6,629,265 | B1 * | 9/2003 | Williams | 714/23 |
| 6,711,701 | B1 * | 3/2004 | Roohparvar et al. | 714/24 |
| 6,829,724 | B2 * | 12/2004 | Farabaugh et al. | 714/14 |
| 6,854,067 | B1 * | 2/2005 | Kutz et al. | 713/340 |
| 7,603,578 | B2 * | 10/2009 | Balasubramanian et al. | 713/330 |
| 2009/0128186 | A1 * | 5/2009 | Balasubramanian et al. | 326/38 |

* cited by examiner

*Primary Examiner*—Joshua A Lohn
(74) *Attorney, Agent, or Firm*—Imperium Patent Works; T. Lester Wallace; Darien K. Wallace (57) ABSTRACT

A microcontroller receives a supply voltage (VCC) from one or more batteries. Rather than automatically resetting the microcontroller if VCC drops below a VBO voltage, a latent VBO reset circuit does not reset the processor if VCC drops below a second voltage (VBO) as long as VCC does not fall so low that a power on reset (POR) circuit of the latent VBO reset circuit is tripped. The processor continues to operate as long as it can below VBO, thereby maximizing battery usage. When VCC rises to a third voltage (for example, due to battery replacement), then the latent VBO reset circuit automatically resets the processor to remove potential ill-effects of having operated below VBO. User data stored in volatile memory is not lost during battery replacement. A special VBO bit in a processor-readable status register indicates that the microcontroller operated below VBO.

21 Claims, 4 Drawing Sheets

VBAT DOES NOT DROP BELOW VPOR

FIG. 1

VBAT DOES NOT DROP BELOW VPOR

FIG. 2

VBAT DROPS BELOW VPOR

LATENT VBO RESET CIRCUIT

TECHNICAL FIELD

The described embodiments relate to microcontrollers, and more particularly relate to battery-powered microcontrollers that see use in universal remote control devices.

BACKGROUND INFORMATION

Microcontrollers are often powered by batteries. Common alkali batteries may, for example, be used to power a microcontroller within a handheld infrared remote control device of the type typically used to control electronic consumer devices in the home. The supply voltage output by such common batteries decreases over a considerable voltage range as the batteries age. Consequently, commercially available microcontrollers that see use in such remote control devices may be specified to operate over relatively wide supply voltage ranges down to low supply voltages (for example, from 3.6 volts down to 2.0 volts). As the battery voltage drops from the voltage output by fresh batteries, the microcontroller is to continue to operate. As the battery voltage drops further and reaches the voltage at which the microcontroller is no longer specified to operate correctly, the microcontroller is to stop gracefully so that it does not function erratically.

In some cases, a microcontroller operating out of its specified supply voltage operating range can enter an illegal state and become "stuck" such that a processor portion of the microcontroller stops executing instructions. If the aged batteries are replaced with fresh batteries in a relatively quick fashion, then a charge may remain on power supply buses and lines within the microcontroller during the battery replacement operation. When fresh batteries are then installed, the processor of such a microcontroller may be seen to remain in its inoperative (stuck) state. This is undesirable.

If, on the other hand, the aged batteries are removed and the internal power supply buses and lines of the microcontroller are allowed to discharge down to ground potential before the fresh batteries are installed, then a power on reset (POR) circuit within the microcontroller will generally reset the processor. After the power on reset, the processor of the microcontroller will begin to execute instructions in proper fashion. Discharging the internal supply lines of the microcontroller in this fashion, however, is also not always desirable. In a remote control device application, it may be desired to keep a voltage on the power supply lines of the microcontroller throughout the battery replacement process. In a low-cost universal remote control device, the user of the remote control device may engage in a cumbersome process of loading codeset selection information into the remote control device. The codeset selection information may be stored in volatile static random access memory (SRAM) on the microcontroller integrated circuit. Such codeset selection information designates which one of multiple codesets should be used to generate RC operational signals that control the user's particular electronic consumer device. If there is enough capacitance on the internal power supply buses and lines to power the SRAM so that the SRAM continues to store the codeset selection information, then the batteries can be replaced without losing the SRAM contents. If the internal power supply lines of the microcontroller are allowed to discharge down to ground potential such that the power on reset circuit will reset the processor and prevent the processor from being stuck after the batteries are replaced, then the codeset selection information in the SRAM may be lost. This is also undesirable.

Although it is possible to provide an amount of non-volatile memory on the microcontroller integrated circuit to store the codeset selection information, providing such non-volatile memory is costly. For cost considerations, microcontrollers of low-cost universal remote control devices typically do not include non-volatile memory to store the codeset selection information.

Some microcontrollers used in remote control devices have a voltage detection circuit called a voltage brownout (VBO) detect circuit. The VBO detect circuit detects when the supply voltage on a power terminal of the microcontroller integrated circuit has dropped to a voltage (called the VBO voltage) at or close to the lower limit of the permissible microcontroller supply voltage operating range. When the VBO detect circuit detects this low voltage condition, the VBO detect circuit may, for example, cause the processor to be reset immediately before the battery voltage drops below the lower limit of the specified supply voltage operating range. The VBO state may, for example, be stored in a VBO bit in a status register such that when the processor recovers from the reset sequence the processor can read the VBO bit in the status register to determine the cause of the reset.

It is desirable that the VBO detect circuitry detect this voltage precisely, but in reality there is a spread from manufactured unit to manufactured unit due to manufacturing variability. VBO detect circuits of seemingly identical microcontroller units are observed to sense the VBO voltage at different voltages. Accordingly, in order to guarantee that no microcontroller unit will attempt to operate down to a supply voltage that is below the actual lower limit of the specified supply voltage operating range, the voltage at which the VBO detect circuit detects the VBO voltage is sometimes designed to be a voltage somewhat above the lower limit of the specified supply voltage range. The VBO detection spread may, for example, be plus or minus 0.15 volts. This spread may be specified by a microcontroller manufacturer as a "VBO minimum" value and a "VBO maximum" value. If the microcontroller is guaranteed to work down to a supply voltage of 1.8 volts, then the nominal VBO trip point may be set to 1.95 volts in order to guarantee that over the 0.15 volt VBO detect spread that the VBO detect circuit of an individual microcontroller unit will always have tripped before the supply voltage drops below the 1.8 volt lower limit of the specified supply voltage range. Unfortunately, if the nominal VBO trip point is set in this fashion, then the voltage at which the VBO detect circuit could trip in an individual microcontroller could be as high as 2.1 volts. If the VBO detect circuit were to trip at 2.1 volts, then the VBO detect circuit would have prevented the microcontroller from operating when the microcontroller could have operated properly and within specification all the way down to a supply voltage of 1.8 volts. Having to account for the VBO detection spread results in a waste of battery energy in many instances.

The manufacturing variability that gives rise to the VBO spread is somewhat unsystematic such that the voltage at which the VBO detect circuit will trip cannot generally be predicted from one unit to the next. A VBO detect circuit can be made to be programmable or trimmable so that the voltage at which an individual VBO detect circuit will trip can be adjusted. The trip voltages of the VBO circuits of the individual microcontrollers can be individually adjusted such that all the VBO detect circuits will all trip in a tighter voltage range. This technique is expensive, however, because each microcontroller is individually tested and adjusted. The technique is generally too expensive for low-cost universal remote control applications. A low-cost solution is desired for how to get more life out of the battery.

SUMMARY

A novel microcontroller integrated circuit of a battery-powered device includes a power terminal, a processor, and a novel "latent VBO reset circuit". The microcontroller receives a supply voltage from one or more batteries through the power terminal. Rather than automatically resetting the processor if the supply voltage drops below a VBO voltage, the novel latent VBO reset circuit does not reset the processor if the supply voltage drops below a second voltage V2 as long as the supply voltage does not fall so low that a power on reset (POR) circuit of the latent VBO reset circuit is tripped and resets the processor. The second voltage V2 is selected to be a voltage at, or slightly above, the lowest supply voltage at which the processor is specified to operate properly. The voltage detection circuit that detects that the supply voltage dropped below the second voltage V2 need not be a particularly accurate circuit and need not be programmable or trimmable. After the supply voltage drops below the second voltage V2, the processor continues to execute instructions as long as it can. A sequential logic element within the VBO reset circuit is set, thereby storing information indicating that the supply voltage had dropped below the second voltage.

If the supply voltage continues to drop until it falls below a first voltage V1 (for example, a power on reset voltage), then the POR circuit trips and the processor is reset. The processor is held in reset as long as the supply voltage remains below the first voltage V1. If the batteries are then replaced such that the supply voltage increases, then the novel VBO reset circuit deasserts the reset signal when the supply voltage has reached a sufficiently high voltage in a power on reset sequence similar to an ordinary conventional power on reset sequence.

If, however, the supply voltage does not drop so low as to cause the POR circuit to trip, but rather the aged batteries are replaced with fresh batteries such that the supply voltage increases and rises above a third voltage V3 when the sequential logic element is in the set state (indicating that the supply voltage had dropped below the second voltage V2), then the novel VBO reset circuit automatically resets the processor. The supply voltage does not drop below the first voltage V1 during battery replacement due to charge being stored on capacitances (for example, capacitances within the microcontroller integrated circuit).

By not previously resetting the processor when the supply voltage dropped below the second voltage V2, the processor was allowed to continue to operate, thereby maximizing the useful life of the batteries. The processor may continue to operate below the lower limit of the supply operating voltage that is specified for typical operation (TYP) due to the fact that the actual operating environment of the processor is more favorable than the typical conditions. The application of the microcontroller is such that erratic operation of the microcontroller is not harmful or dangerous. If the microcontroller functions erratically or stops functioning altogether due to the supply voltage having dropped too far, this is acceptable because additional usage of batteries was obtained. The automatic resetting of the processor upon the replacement of the aged batteries with fresh batteries removes latent potential ill-effects of having operated the processor at supply voltages below the second voltage V2.

In one aspect, the novel microcontroller integrated circuit is part of a handheld infrared universal remote control device. The user programs RC codeset selection information into the remote control device. This information is stored in volatile memory on the microcontroller integrated circuit. When the aged batteries are replaced with fresh batteries as set forth above in the scenario where the processor is not reset in a power on reset sequence, adequate charge is stored in capacitances within the microcontroller integrated circuit that the RC codeset selection information is not lost but rather is maintained in the volatile memory throughout the battery replacement operation. When processor operation resumes under the power of the fresh batteries, the processor can access and use the RC codeset selection information. The user of the universal remote control device therefore does not have to reprogram the RC codeset selection information into the remote control device after replacing the batteries.

In another novel aspect, a special VBO bit is provided in a status register with the microcontroller. The special VBO bit being set indicates that the supply voltage dropped below the second voltage V2 and then increased above the third voltage V3 without ever having gone so low that a power on reset condition was reached. After being reset, the processor can read the value of the special VBO bit out of the status register and determine the reason that the processor was last reset. The processor can clear the special VBO bit by writing a digital low value into the special VBO bit in the status register. The special VBO bit is also cleared automatically on power on reset.

Further details are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
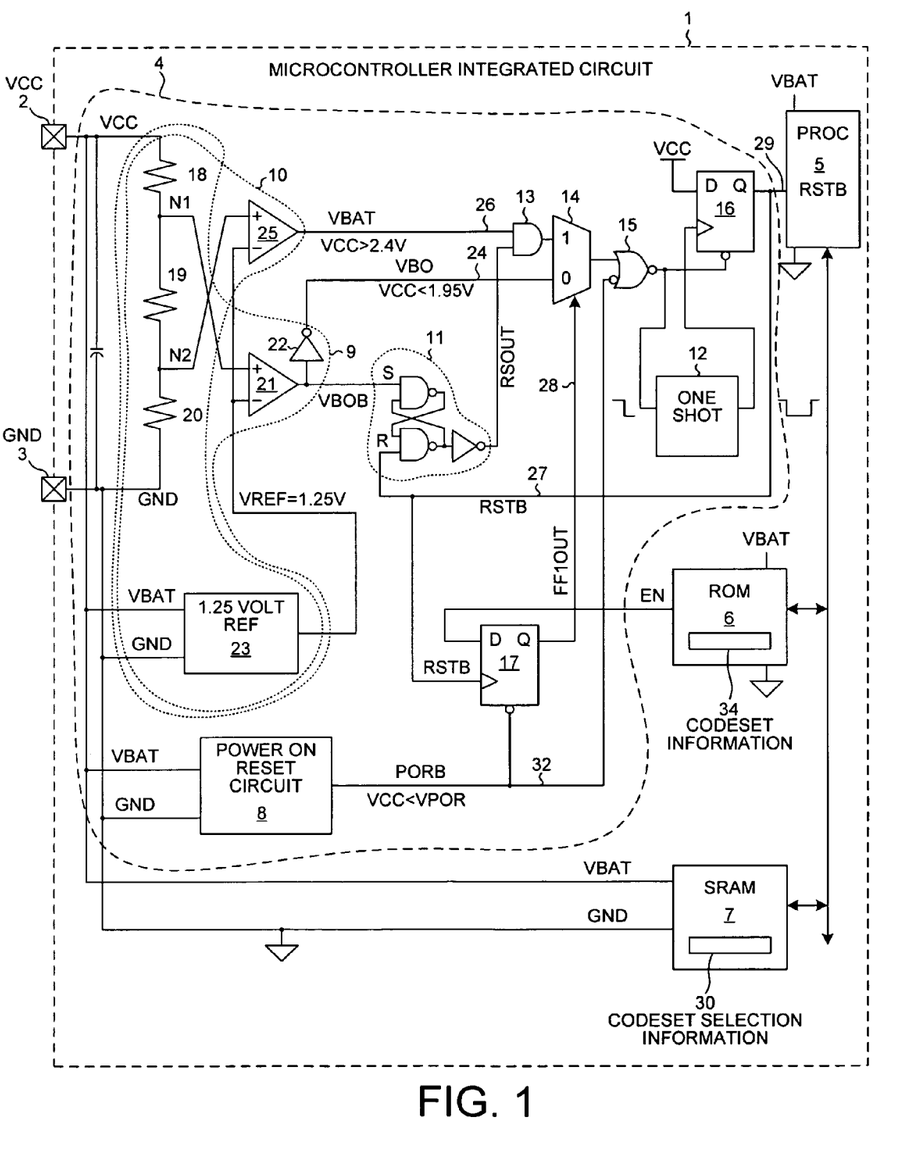
FIG. 1 is a simplified diagram of a novel microcontroller integrated circuit that includes a novel "latent VBO reset circuit" in accordance with one novel aspect.

FIG. 1 is a simplified diagram of a microcontroller integrated circuit 1 in accordance with one novel aspect. Microcontroller integrated circuit 1 includes a power terminal 2 (also called a supply voltage terminal or VCC terminal), a ground terminal 3, a novel reset circuit 4 referred to here as a "latent VBO reset circuit", a digital processor 5 that executes instructions, a read only memory (ROM) 6, and a static random access memory (SRAM) 7. Latent VBO reset circuit 4 causes processor 5 to be reset automatically if a supply voltage on power terminal 2 falls below a second voltage (for example, 1.95 volts) and then rises above a third voltage (for example, 2.4 volts) without first falling below a first voltage (for example, 1.6 volts).

Latent VBO reset circuit 4 includes a power on reset (POR) circuit 8. POR circuit 8 can be an AC-type POR circuit that is sensitive to the edge rate of the supply voltage on terminal 2. POR circuit 8 can also be a DC-type level sensitive POR circuit that outputs an active low power on reset (POR) signal circuit 8 whenever the supply voltage between terminals 2 and 3 is below the first voltage. In the embodiment illustrated in FIG. 1, POR circuit 8 is of the DC-type. When a voltage source (for example, one or more batteries) is first coupled across terminals 2 and 3, the voltage on terminal 2 begins to rise from ground potential. POR circuit 8 maintains the POR signal at an active low digital value until the voltage on terminal 2 reaches the first voltage (1.6 volts in this case). POR circuit 8 then deasserts the POR signal to a digital high. This takes the microcontroller out of the reset state only after an adequate supply voltage is powering the microcontroller. When the POR signal is deasserted to a digital high, processor 5 can begin to execute instructions if enabled to do so by the latent VBO reset circuit.

Latent VBO reset circuit 4 also includes a first voltage detection circuit 9 that detects if the voltage on terminal 2 is below the second voltage, a second voltage detection circuit 10 that detects if the voltage on terminal 2 is above the third voltage, a sequential logic element 11, a one shot 12 that outputs a digital low pulse, and various other digital logic elements 13-17.

First voltage detection circuit 9 includes a resistor voltage divider string made up of resistors 18-20. One end of the resistor string is coupled to power terminal 2 and the other end of the resistor string is coupled to ground terminal 3. First voltage detection circuit 9 also includes a comparator 21 and a digital logic inverter 22. The non-inverting input lead of comparator 21 is coupled to node N1 on the resistor voltage divider string and the inverting input lead of comparator 21 is coupled to a reference voltage source 23. Reference voltage source 23 in this embodiment is a bandgap reference voltage source that outputs a 1.25 volt reference voltage. The resistances of resistors 18-20 are selected such that if the voltage on terminal 2 is at 1.95 volts (the second voltage V2), then 1.25 volts is present on node N1. Accordingly, if the supply voltage on terminal 2 is below 1.95 volts, then comparator 21 outputs a digital low value. Inverter 22 asserts a signal VBO on line 24 to a digital high value.

Second voltage detection circuit 10 includes the same resistor voltage divider string made up of resistors 18-20. Second voltage detection circuit 10 further includes a comparator 25. The non-inverting input lead of comparator 21 is coupled to node N2 on the resistor voltage divider string and the inverting input lead of comparator 25 is coupled to receive the 1.25 volt reference voltage from reference voltage source 23. The resistances of resistors 18-20 are selected such that if the voltage on terminal 2 is at 2.4 volts (the third voltage V3), then 1.25 volts is present on node N2. Accordingly, if the supply voltage on terminal 2 is above 2.4 volts, then comparator 25 asserts the signal VBAT on line 26 to a digital high value.

Figure 2:
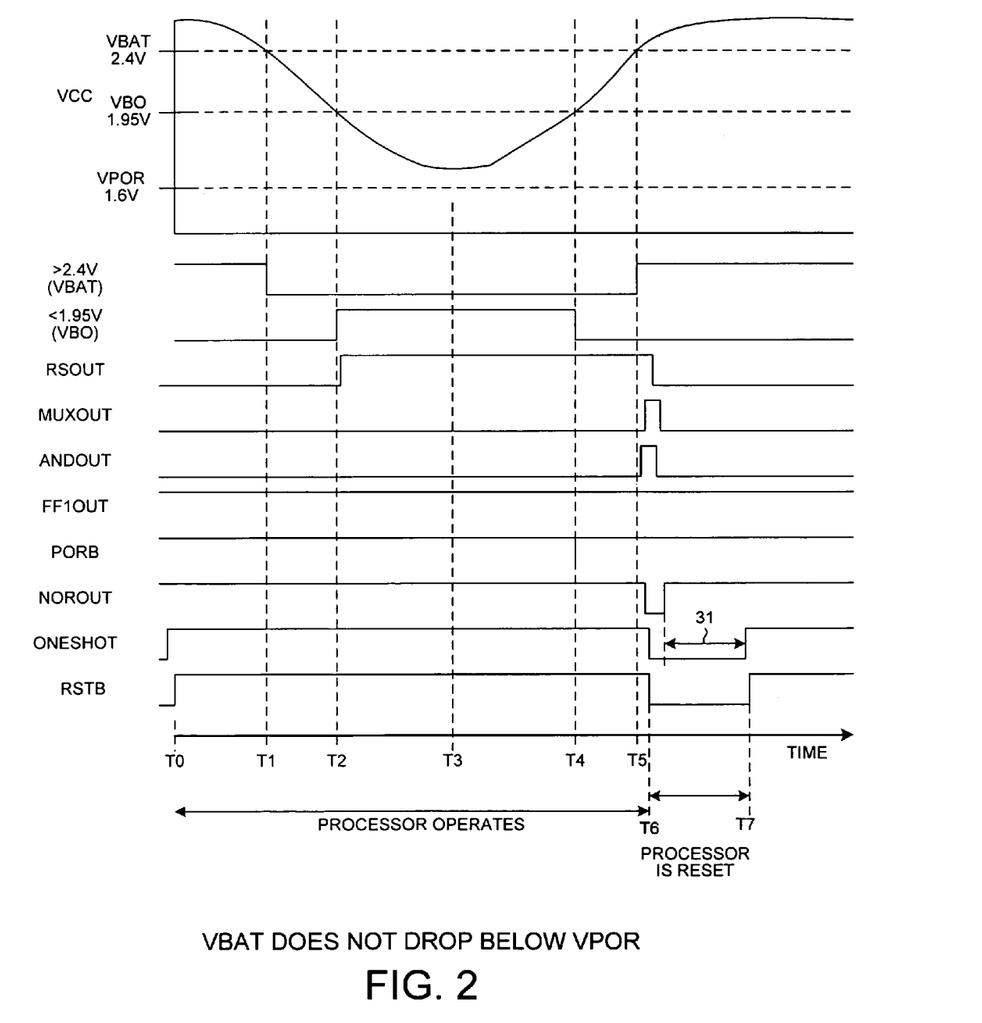
FIG. 2 is a simplified waveform diagram that illustrates an operation of the novel microcontroller of FIG. 1 in a first scenario in which the supply voltage drops below a second voltage V2 and then rises above a third voltage V3 without first falling below a first voltage V1 and causing a power on reset to occur. When the supply voltage reaches the third voltage V3, the latent VBO reset circuit resets the processor of the microcontroller.

An operation of microcontroller 1 of FIG. 1 is described in connection with the waveform diagram of FIG. 2. Initially, one or more batteries are coupled across the power and ground terminals 2 and 3 of microcontroller integrated circuit. As illustrated at time T0 in FIG. 2, the supply voltage on terminal 2 is at a voltage that exceeds the third voltage V3 (V3 is 2.4 volts in this case). Processor 5 is executing instructions and the microcontroller is operating in normal fashion. Because the supply voltage is higher than 2.4 volts, the second voltage detection circuit 10 is asserting signal VBAT to a digital logic high. Sequential logic element 11, which is an SR latch in this example, was previously reset by a previous assertion of an active low reset signal RSTB on line 27. Consequently, the signal RSOUT that is output from latch 11 is a digital low as indicated by the waveform of FIG. 2. The output of AND gate 13 is therefore a digital low. The output of AND gate 13 is represented by the waveform designated ANDOUT on FIG. 2. A digital one was loaded into the flip-flop 17 by the rising edge of the reset signal RSTB at the conclusion of the previous assertion of the reset signal RSTB. The digital one is the value of an enable bit stored in ROM 6. The value of this bit is supplied as signal EN to the D-input of flip-flop 17. Accordingly, if the enable bit is set as in the example of the waveform of FIG. 2, then a digital high value is loaded into flip-flop 17 on the rising edge at the end of the assertion of the reset signal RSTB. The digital high content of flip-flop 17 is supplied as signal FF1OUT on line 28 to the select input lead of multiplexer 14. Multiplexer 14 therefore selects the "1" data input lead. The digital low output from AND gate 13 therefore passes through multiplexer 14 and to the upper input lead of NOR gate 15. Because the voltage on terminal 2 is higher than the first voltage V1 (the POR voltage of 1.6 volts), the PORE signal output by POR circuit 8 is a digital high as indicated in the waveform of FIG. 2. NOR gate 15 therefore outputs a digital high as indicated by the value of the signal NOROUT in FIG. 2. Flip-flop 16 is therefore not being asynchronously reset. Flip-flop 16, which was loaded with a digital high value at the conclusion of a previous pulse of one shot 12, outputs a digital high value as signal RSTB on line 29 to the active low reset signal input of processor 5. This is the condition set forth at time T0 in the waveform diagram of FIG. 2.

Next, the voltage output by the batteries decreases until the supply voltage VCC on terminal 2 falls below the third voltage V3 (2.4 volts in this example). Second voltage detection circuit 10 detects this condition and deasserts signal VBAT to a digital low as illustrated at time T1 in FIG. 2. The value output by AND gate 13 continues to be a digital low.

Next, the voltage output by the batteries continues to decrease until the supply voltage VCC on terminal 2 reaches the second voltage V2 (1.95 volts in this example). The second voltage is the specified lower limit, or very close to the specified lower limit, of the supply voltage operating range of the microcontroller. The second voltage V2 is a voltage at, or slightly above, the lowest supply voltage on terminal 2 from which the microcontroller is specified (over process and temperature) to operate correctly. The second voltage can be loosely referred to at as the "VBO voltage" even though the second voltage can be a voltage slightly above the actual supply voltage minimum (over temperature and process) specified for the microcontroller.

When the supply voltage on terminal 2 falls below the second voltage V2), the first voltage detector circuit 9 asserts the signal VBO to a digital high as illustrated at time T2 in the waveform diagram of FIG. 2. The VBOB signal that is supplied to the upper set (S) input of latch 11 therefore transitions to a digital low, thereby forcing the RS latch 11 into the set condition. The signal RSOUT therefore transitions to a digital high value as illustrated in FIG. 2. Latch 11 has latched so that it stores information indicative of that fact that the supply voltage VCC was below the second voltage V2.

Next, the voltage output by the batteries continues to decrease. Rather than disabling or resetting processor 5, processor 5 continues to execute instructions. Where microcontroller integrated circuit 1 is part of a handheld infrared universal remote control device, microcontroller integrated circuit 1 may continue to operate satisfactorily such that a user of the remote control device can still use the remote control device to control an electronic consumer device (for example, a television). Microcontroller 1 can still detect a user key press and then use codeset information 34 stored in ROM 6 to generate appropriate signals that drive an infrared light emitting diode (LED) of the remote control device such that infrared RC operational signals are transmitted from the remote control device to the electronic consumer device. Note in the waveform of FIG. 2 that the RSTB signal is not at a digital low value. The microcontroller at this time may be operating below the specified lower limit of the supply voltage. As the supply voltage on terminal 2 drops lower and lower, the microcontroller may malfunction and act erratically. This is acceptable because erratic microcontroller operation in the remote control application does not have life-threatening or other serious consequences. Rather than acting erratically, the processor of the microcontroller may enter an illegal state and cease to execute instructions (i.e., may become "stuck"). This is acceptable because the user may obtain additional usage of the battery before the stuck condition in comparison to a conventional microcontroller that is disabled once the supply voltage drops below the lower limit of the supply voltage range.

In the example of FIG. 2, the batteries that power microcontroller integrated circuit 1 are replaced at time T3. When the aged batteries are removed, adequate charge remains on the internal supply and ground buses of the microcontroller that the contents of SRAM 7 are maintained until fresh batteries are installed in the remote control device. Care is taken to ensure that the leakage off these internal structures is slow enough to support SRAM 7 during a battery replacement operation of normal duration. Alternatively, or in addition, external capacitance such as an external bypass capacitor can be provided to store the necessary charge to support SRAM 7 during a battery replacement operation.

Codeset selection information 30 stored in SRAM 7 is therefore maintained throughout the battery replacement operation. Codeset selection information 30 indicates which one of multiple codesets 34 is to be used to generate RC operational control signals. In the present example where the microcontroller is a part of a universal remote control device, the user loaded the proper codeset selection information 30 such that the RC operational control signals output by the universal remote control device will control a particular electronic consumer device. After battery replacement, the supply voltage VCC on terminal 2 increases. This is illustrated in delayed fashion in FIG. 2.

When the supply voltage VCC on terminal 2 reaches the second voltage V2, then the first voltage detect circuit 9 deasserts the signal VBO low to indicate that the supply voltage is not below the second voltage. The active low SET signal on the upper S input lead of latch 11 is therefore removed.

Next, the supply voltage VCC on terminal 2 reaches the third voltage V3. In the present example, this third voltage is a relatively high voltage (for example, 2.4 volts) that is less than the voltage output by fresh batteries. (For two alkali batteries, the fresh battery voltage is typically 3.6 volts). When the supply voltage on terminal 2 reaches the third voltage as indicated at time T5 in the waveform diagram of FIG. 2, the second voltage detect circuit 10 asserts the signal VBAT to a digital high to indicate that the supply voltage has risen beyond the third voltage. Because the value of signal RSOUT is a digital high due to latch 11 having been set (latch 11 stores information indicative of the fact that the supply voltage dropped below the second voltage), AND gate 13 outputs a digital high signal. The digital high signal passes through multiplexer 14, and causes NOR gate 15 to output a digital low signal. The digital low output by NOR gate 15 is present on the asynchronous reset input lead of flip-flop 16. Flip-flop 16 therefore asserts the signal RSTB to a digital low, thereby resetting processor 5 at time T6. The transitioning low of the signal output by NOR gate 15 triggers one shot 12, which in turn initiates a low pulse as indicated in the waveform labeled ONESHOT in FIG. 2. The RSTB signal on line 27 is asserted onto the lower reset (R) input lead of latch 11, thereby resetting latch 11. Signal RSOUT is therefore forced low. This forces the output of AND gate 13 low. The low output of AND gate 13 passes through multiplexer 14 and forces the output of NOR gate 15 to a digital high value. The result of this signal loop is that the output of NOR gate 15 pulses low as illustrated in FIG. 2. One shot 12 functions to generate an active low pulse whose end is timed from the rising edge of the signal supplied to the input of the one shot. This time is indicated by arrow 31 in FIG. 2. When time 31 expires, one shot 12 forces the signal supplied onto the clock input lead of flip-flop 16 to a digital high. This rising edge causes flip-flop 16 to load a digital high value and to deassert the RSTB signal to a digital high. This is indicated at time T7 in the waveform of FIG. 2.

The latent VBO reset circuit 4 of FIG. 1 therefore functions to reset processor 5 when the supply voltage reaches the third voltage V3 if the supply voltage had previously dropped below the second voltage V2 without having fallen so low that the power on reset circuit 8 reset the entire circuit. The supply voltage is made to reach the third voltage V3 before the RSTB signal is asserted low to provide a degree of hysteresis such that small supply voltage fluctuations around the second voltage V2 do not result in the processor being repeatedly reset.

In the event that processor 5 became stuck, the resetting of processor 5 between times T6 and T7 puts the processor back into a known state that allows it to start executing properly as if it were starting operation after an ordinary power on reset condition. Codeset selection information 30 in SRAM 7 is not lost, so the user does not have to engage in the sometimes cumbersome exercise of reloading the codeset selection information into the remote control device. As the voltage on terminal 2 decreases below the second voltage V2 detected by first voltage detect circuit 9, the processor 5 is allowed to continue to operate as long as it can. This extends usage of the batteries in comparison to circuits where the microcontroller is reset when the supply voltage drops below VBO.

Figure 3:
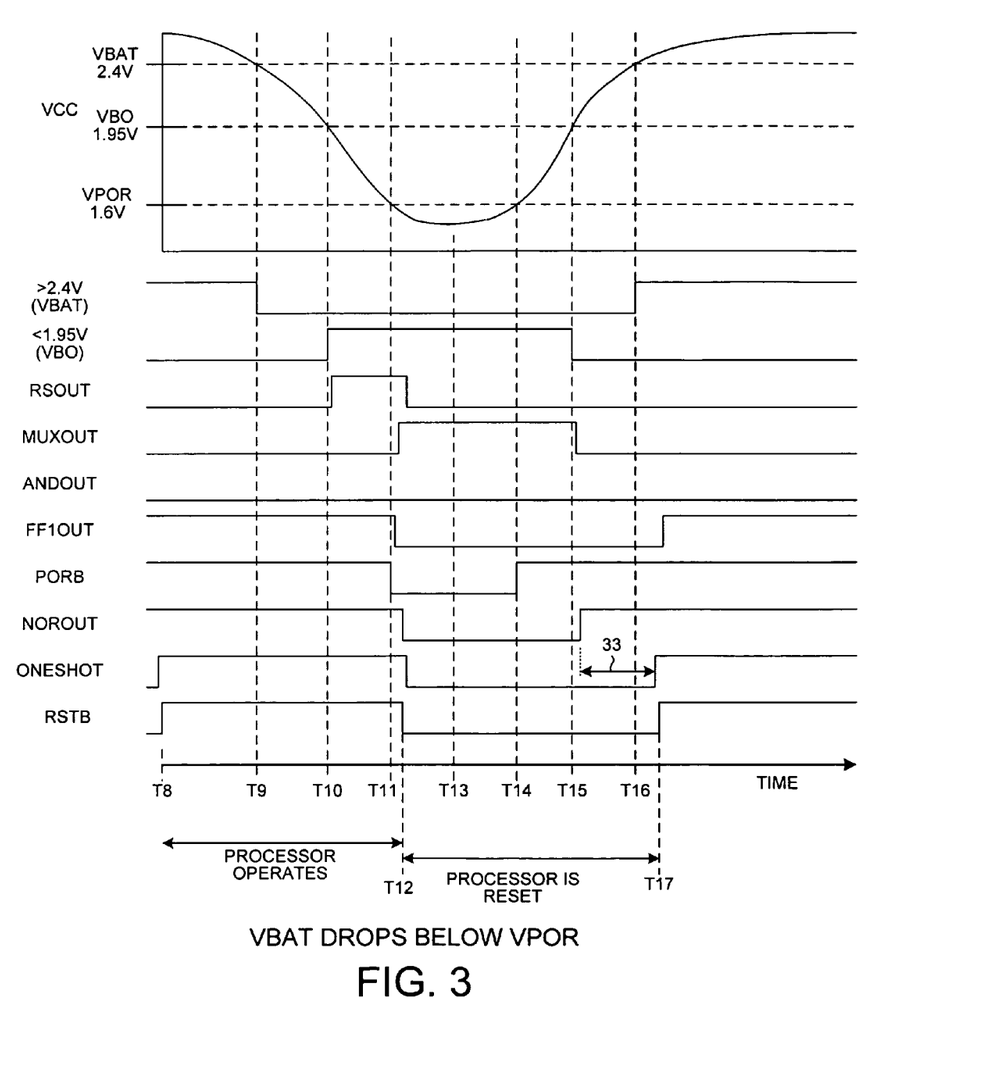
FIG. 3 is a simplified waveform diagram that illustrates an operation of the novel microcontroller of FIG. 1 in a second scenario in which the supply voltage drops below the second voltage V2 and then continues to drop below the first voltage V1 such that a power on reset occurs. When the supply voltage increases (for example, due to replacement of batteries that power the microcontroller) to an adequately high voltage (for example, the second voltage V2), the power on reset circuit of the latent VBO reset circuit removes the power on reset signal and takes the processor out of reset.

FIG. 3 is a waveform diagram that illustrates an operation of microcontroller 1 in a scenario where the supply voltage VCC on terminal 2 drops below the second voltage V2 and then proceeds to drop further such that it causes the POR circuit 8 to reset the entire microcontroller. Initially, at time T8, the supply voltage VCC on terminal 2 is above the third voltage V3. The state of the circuit is as explained at time T0 in connection with the waveforms of FIG. 2. The supply voltage on terminal 2 then continues to fall until it reaches the third voltage V3 at time T9. The supply voltage continues to fall until it reaches the second voltage V2 at time T10. As in the scenario of FIG. 2, latch 11 is set to store information that indicates that the supply voltage dropped below the second voltage. The signal output from latch 11, the RSOUT signal, is seen to transition high shortly after time T10. Note that the RSTB signal is not asserted low and the processor 5 is not reset but rather continues to operate and execute instructions if it can. Allowing the processor 5 to continue to operate and execute instructions as long as it can extends the useful life of the batteries.

The supply voltage on terminal 2 continues to drop until it falls so low that POR circuit 8 is activated an asserts the PORB signal to a digital low on line 32. In the example of FIG. 1 where POR circuit 8 is an ordinary DC-type circuit, PORB is asserted low as soon as the supply voltage on terminal 2 falls below the first voltage V1 (VPOR voltage of 1.6 volts). The assertion of the PORE signal to a digital low is illustrated at time T11 in the waveform of FIG. 3. PORE being a digital low resets flip-flop 17, thereby causing flip-flop output signal FF1OUT to a digital low, and thereby controlling multiplexer 14 to select the "0" input lead. Signal VBO on line 24 is a digital high, so multiplexer 14 continues to output a digital high signal MUXOUT as the signal FF1OUT supplied onto the multiplexer select input lead changes digital logic values.

Signal PORE being asserted to a digital low causes NOR gate 15 to output a digital low value. This digital low value in turn resets flip-flop 16, thereby causing flip-flop 16 to assert RSTB to a digital low value. This is illustrated at time T12 in the waveform of FIG. 3. The supply voltage VCC on terminal 2 falling below the first voltage (1.6 volts) therefore causes processor 5 to be held in the reset state.

RSTB being a digital low on line 27 puts a digital low signal on the lower reset (R) input lead of latch 11. At this time, digital logic low signals are present on both the set (S) and the reset (R) inputs of latch 11. The digital logic low value of signal RSTB on the reset input lead, however, forces the latch output signal RSOUT to a digital low value. The signal RSOUT therefore transitions to a digital low value as indicated in FIG. 3.

Next, the aged batteries are replaced with fresh batteries. The codeset selection information 30 stored in SRAM 7 may or may not be lost, depending on how low the supply voltage VCC was allowed to drop. In the scenario of the waveform of FIG. 3, the codeset selection information 30 was not lost because the battery voltage, although low, was nonetheless of adequate magnitude to maintain the information in SRAM 7. Enough charge is maintained on the internal supply and ground lines and buses within microcontroller 1 that the information is maintained in SRAM 7 throughout the time expended removing the used batteries and inserting fresh batteries. The insertion of fresh batteries occurs at time T13 in the example of FIG. 3.

The supply voltage on terminal 2 then increases due to the fresh batteries being coupled across terminals 2 and 3. When the voltage on terminal 2 rises above the first voltage V1 (VPOR of 1.6 volts), DC-type POR circuit 8 desasserts the PORB signal to a digital high value as indicated at time T14 in FIG. 3. The supply voltage on terminal 2 continues to rise until it exceeds the second voltage V2 at time T15. The first voltage detect circuit 9 therefore deasserts signal VBO to a digital low value to indicate that the voltage on terminal 2 is not below the second voltage. This low VBO signal on line 24 passes through multiplexer 14 which forces the signal MUXOUT to a digital low value. Because the MUXOUT signal is a digital low value, and because the PORB signal is now a digital high value, NOR gate 15 outputs a digital high signal as indicated by the waveform of FIG. 3.

The deassertion of the signal VBOB to a digital high value at time T15 also removes the digital low signal that was present on the set input lead of latch 11. The latch 11 does not, however, switch state. The digital low signal on the reset input lead of latch 11 due to the signal RSTB on line 27 being a digital logic low remains. RSOUT therefore continues to be a digital logic low value.

In the waveform scenario of FIG. 3, the supply voltage on terminal 2 continues to rise until it reaches the third voltage V3. The second voltage detect circuit 10 then asserts the VBAT signal at time T16 to a digital high to indicate that the supply voltage is greater than the third voltage V3. One shot 12 starts timing the duration of its output low pulse from the rising edge of the NOROUT signal output from NOR gate 15. The timing of one shot 12 is represented by arrow 33 in FIG. 3. At the end of time 33, the ONESHOT signal output by one shot 12 transitions to a digital high such that flip-flop 16 is clocked. Flip-flop 16 loads in a digital high value, and therefore deasserts the signal RSTB to a digital high at time T17. It is therefore seen that in a scenario in which the supply voltage on terminal 2 decreases so low that the power on reset circuit 8 is tripped, that processor 5 is reset and held in the reset state until the voltage on terminal 2 is detected to have exceeded the second voltage. At the conclusion of a power on reset sequence, latent VBO reset circuit 4 then deasserts the RSTB signal on line 27 to a digital logic high value, thereby enabling microcontroller operation as in a standard power up scenario.

The automatic resetting of processor 5 after a condition of the supply voltage dropping below the second voltage as explained above in connection with FIG. 2 can be disabled by programming the enable bit in ROM 34 that controls the digital value of enable signal EN. If the enable signal EN is programmed to be a digital low value, then flip-flop 17 will never be set. The output signal FF1OUT will never be a digital high value, and multiplexer 14 will always select the "0" data input lead. Accordingly, if the supply voltage on terminal 2 is below the second voltage V2, then the VBO signal on line 24 will be a digital high value and this signal will pass through multiplexer 14 and NOR gate 15 to asynchronously reset flip-flop 16, thereby asserting RSTB to a digital low value and resetting processor 5 regardless of the information stored in latch 11. The multiplexer select signal FF1OUT on line 28 never changes, so circuit operation is also independent of the VBAT signal on line 26. The enable bit in ROM 6 can, for example, be a factory-maskable bit that is programmed during circuit manufacture to output either a digital high or a digital low, as desired.

Figure 4:
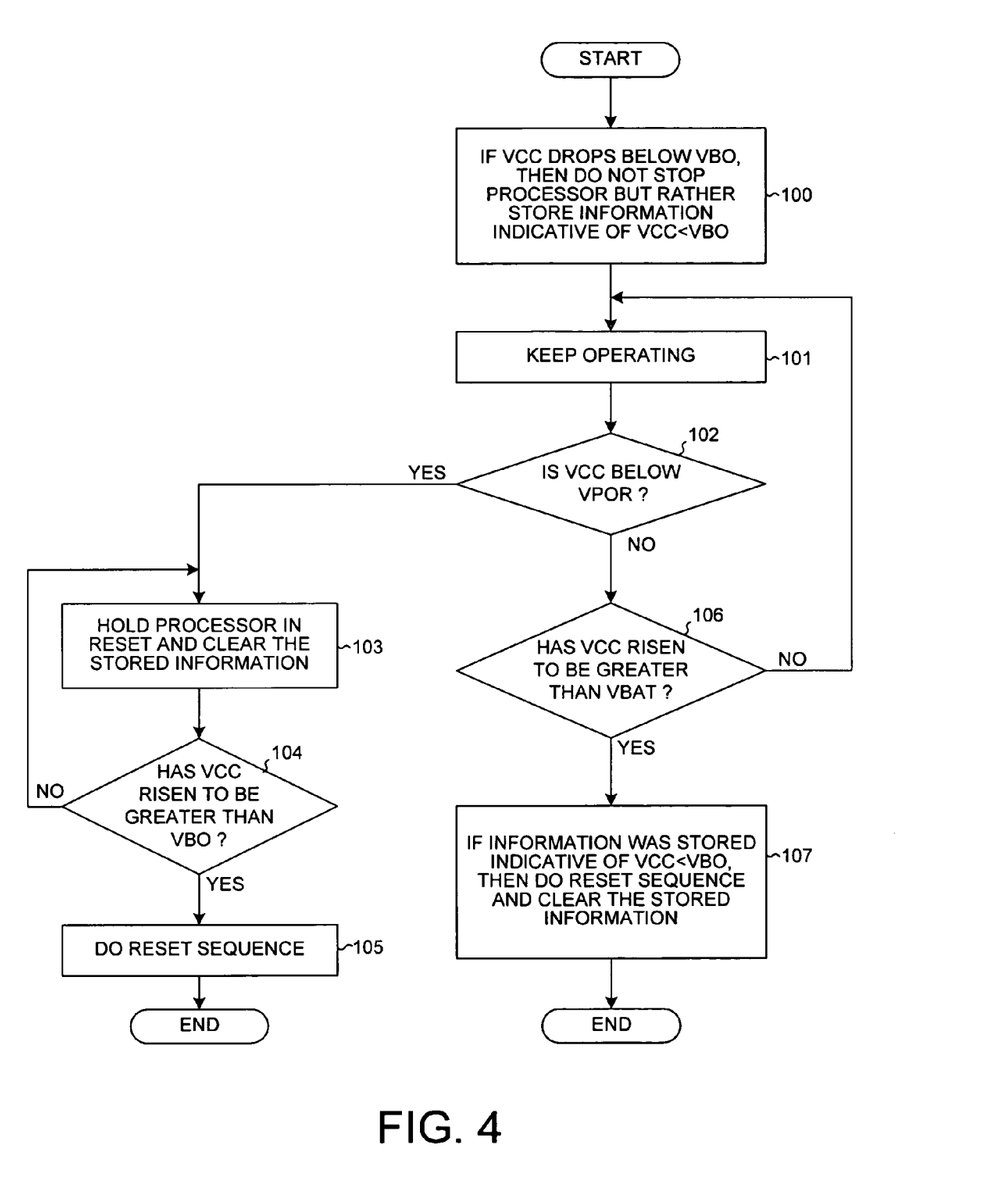
FIG. 4 is a flowchart that illustrates operation of the novel microcontroller of FIG. 1 in the scenarios of FIGS. 2 and 3.

FIG. 4 is a flowchart diagram of a novel method. Initially, processor 5 is operating and executing instructions in normal fashion. If the supply voltage VCC on terminal 2 drops below the second voltage (designated voltage VBO in FIG. 3), then the processor is not stopped and is not reset, but rather is allowed to continue to execute instructions if it can. Latch 11 is, however, set to store information (step 100) indicative of the fact that the supply voltage VCC had dropped below VBO. Processor 5 continues to operate (step 101) while the supply voltage VCC continues to drop. If the supply voltage VCC drops below the first voltage (VPOR) at which the power on reset circuit 8 trips (step 102), then the power on reset circuit 8 trips and processor 5 is held in the reset state (step 103). If the batteries that power the terminals 2 and 3 are replaced such that the supply voltage VCC rises to be greater than VBO (step 104), then a normal power on reset sequence is performed (step 105). After the power on reset sequence the processor begins executing instructions as it would in a normal power on reset situation.

Returning to step 102, as long as the supply voltage VCC remains above VPOR and does not rise to VBAT, the processor is not reset and is allowed to keep operating (step 101). If, however, at step 102 the supply voltage VCC does not drop below the first voltage (VPOR) but rather the batteries are replaced such that the supply voltage VCC rises (step 106) to be greater than the third voltage (VBAT), then latent VBO reset circuit 4 causes processor 5 to be reset (step 107) if information was stored in step 100 indicating that the supply voltage VCC had previously dropped below the second voltage VBO. After the reset sequence, the processor again begins executing instructions.

Although not illustrated in the simplified diagram of FIG. 1, microcontroller 1 includes a status register, the contents of which can be read by processor 5. This status register includes a special "VBO bit" that is set in the event the supply voltage dropped below the second voltage and then rose above the third voltage without the processor being reset in a power on reset sequence as in the scenario of FIG. 3. Upon recovering from the VBO-initiated reset condition of FIG. 3, processor 5 can read the content of this special VBO bit by reading the status register and determine the reason that the processor was last reset. The processor can clear the special VBO bit by writing a digital low value into the special VBO bit in the status register. The special VBO bit is also cleared automatically on power on reset. In one embodiment, the special VBO bit is included in the status register in addition to a conventional VBO bit that is simply set whenever the supply voltage, drops below the second voltage.

Although certain specific embodiments are described above for instructional purposes, the teachings of this patent document have general applicability and are not limited to the specific embodiments described above. Rather than storing information indicative of whether the supply voltage dropped below VBO and then increased over VBAT without first dropping below VPOR, the sequential logic element in the reset circuit in other embodiments stores indications of another function of supply voltage and other voltage history and/or microcontroller state history. A voltage monitored by the reset circuit can be a voltage other than the voltage on a power terminal. The reset circuit is not limited to use in microcontrollers, but rather sees use in other types of integrated circuits, particularly battery-powered integrated circuits. Although the supply voltage is made to increase up to the third voltage V3 before processor 5 is reset in the scenario of FIG. 3, this is but one example of how to introduce hysteresis into circuit operation. Although the supply voltage is made to increase up to the second voltage V2 before processor 5 is taken out of power on reset in the scenario of FIG. 2, this is also but one example of how to combine VBO and POR functions into circuit operation. Comparators 21 and 25 can have hysteresis switching characteristics. In some embodiments, the signal RSTB is deasserted high to terminate a reset condition upon the supply voltage reaching the same voltage in both of the two scenarios of FIGS. 2 and 3. The user data that is maintained in volatile memory throughout the battery replacement operation need not be codeset selection information, but rather can be other types of user data. The latent VBO reset circuit can be employed in devices that use nonvolatile memory to store user data, codesets, and/or codeset selection information. Nonvolatile memory rather than SRAM and factory mask-programmable ROM can be used to store codeset selection information. Accordingly, various modifications, adaptations, and combinations of various features of the described embodiments can be practiced without departing from the scope of the invention as set forth in the claims.

What is claimed is:

1. A microcontroller integrated circuit comprising:
 a power terminal;
 a digital processor that executes instructions; and
 a reset circuit that causes the processor to initiate reset if a supply voltage on the power terminal falls below a second voltage V2 and then rises above a third voltage V3 without first falling below a first voltage V1, wherein $0<V1<V2<V3$.

2. The microcontroller integrated circuit of claim 1, wherein the reset circuit comprises:
 a power on reset (POR) circuit that causes the processor to be held in a reset state for a period of time after a power up condition.

3. The microcontroller of claim 2, wherein the POR circuit causes the processor to be reset if the supply voltage falls below V1.

4. The microcontroller of claim 1, further comprising:
 a volatile memory that stores codeset selection information.

5. The microcontroller of claim 1, wherein the reset circuit comprises:
 a sequential logic element that is set if the supply voltage falls below V2;
 a voltage detection circuit that detects if the supply voltage exceeds V3; and
 a one shot that outputs a pulse if the voltage detection circuit detects that the supply voltage exceeds V3 when the sequential logic element is set, wherein the processor is held in the reset state when the one shot is outputting the pulse.

6. The microcontroller of claim 1, wherein the second voltage V2 is a brown out voltage.

7. The microcontroller of claim 1, wherein the second voltage V2 is a brown out voltage, wherein the supply voltage falls below the second voltage V2 and then rises above the third voltage V3, and wherein the processor executes instructions when the supply voltage is below the second voltage V2.

8. A method comprising:
 (a) detecting that a supply voltage on a power terminal of a microcontroller has fallen below a second voltage V2;
 (b) storing information indicative of the supply voltage having dropped below the second voltage V2;
 (c) continuing to operate a processor portion of the microcontroller after the storing of (b) while the supply voltage is below the second voltage V2;
 (d) detecting that the supply voltage has risen above the third voltage V3, wherein V2<V3; and
 (e) automatically initiating resetting the processor if the information stored in (b) indicates that the supply voltage dropped below the second voltage V2 and if the supply voltage was then detected in (d) to have risen above the third voltage V3, without having fallen below a first voltage V1, where $0<V1<V2<V3$.

9. The method of claim 8, wherein the microcontroller includes a power on reset (POR) circuit, and wherein the processor is not reset by the POR circuit between the detecting of (a) and the detecting of (d).

10. The method of claim 8, wherein the microcontroller includes a power on reset (POR) circuit that resets the processor if the supply voltage drops below the first voltage V1.

11. The method of claim 8, wherein the microcontroller is powered by a battery, and wherein the rising of the supply voltage that is detected in (d) is due to a replacement of the battery.

12. The method of claim 8, wherein the second voltage V2 is a brown out voltage.

13. The method of claim 8, the method further comprising:
 (f) replacing a battery that powers the microcontroller, wherein the rising of the supply voltage that is detected in (d) is due to the replacing;
 (g) storing codeset selection information in a volatile memory portion of the microcontroller, wherein the codeset selection information is stored in the memory portion throughout a period extending from the detecting of (a) through the resetting of (e); and (h) the processor accessing the codeset selection information after the resetting of (e).

14. A microcontroller integrated circuit comprising:
a processor;
means for automatically initiating resetting the processor if a supply voltage rises above a fresh battery voltage (V3) after having dropped below a brown out voltage (V2), and not dropping below a power on reset voltage (V1), wherein the processor continues to execute instructions after the supply voltage drops below the brown out voltage, and wherein $0<V1<V2<V3$.

15. The microcontroller integrated circuit of claim 14, further comprising:
a power on reset (POR) circuit that resets the processor if the supply voltage drops below the power on reset voltage (V1).

16. The microcontroller integrated circuit of claim 14, further comprising:
a volatile memory that stores information, wherein the information is maintained in the volatile memory during a period when the supply voltage is below V2, wherein the means resets the processor and wherein the processor uses the information after the resetting.

17. A method comprising:
(a) powering a microcontroller from a battery;
(b) storing information in a volatile memory of the microcontroller;
(c) operating the microcontroller such that a processor portion of the microcontroller executes instructions;
(d) continuing to operate the microcontroller after a supply voltage on a power terminal of the microcontroller drops below a brown out voltage;
(e) replacing the battery such that the supply voltage rises above a fresh battery voltage;
(f) detecting that the supply voltage has risen above the fresh battery voltage after having dropped below the brown out voltage, but not dropped below a power on reset voltage, and in response to said detecting initiating resetting of the processor; and (g) after the resetting again operating the microcontroller such that the processor portion of the microcontroller again executes instructions, wherein the information stored in the volatile memory in (b) remains stored in the volatile memory throughout a period from the storing of (b) through the resetting of (f), and wherein the processor portion uses the information in (g).

18. The method of claim 17, wherein the processor is not reset between the continuing of (d) and the replacing of (e), but wherein the processor stops executing instructions altogether due to the supply voltage having dropped too low.

19. The method of claim 17, wherein the information is codeset selection information.

20. The method of claim 17, wherein an amount of energy from the battery is stored in a capacitance, and wherein the amount of energy is used to maintain the information in the volatile memory during the replacing of the battery in (e).

21. A method comprising:
(a) using a power on reset circuit to reset a processor of a microcontroller in response to an energy source being coupled to a power terminal of the microcontroller or in response to a supply voltage dropping to a first voltage V1;
(b) detecting that the supply voltage on the power terminal has dropped below a second voltage V2 and then risen above a third voltage V3;
(c) executing instructions using the processor of the microcontroller after the supply voltage dropped below the second voltage V2 and before the supply voltage rose above the third voltage V3; and
(d) resetting the processor in response to detecting that the supply voltage has risen above the third voltage V3 in (b), wherein the power on reset circuit does not reset the processor at any time between detecting that the supply voltage has dropped below the second voltage V2 in (b) and the resetting of (d), wherein $0<V1<V2<V3$.

* * * * *